United States Patent
Hanson et al.

(10) Patent No.: US 7,640,230 B2
(45) Date of Patent: Dec. 29, 2009

(54) QUERY PLAN SELECTION CONTROL USING RUN-TIME ASSOCIATION MECHANISM

(75) Inventors: Eric N. Hanson, Bellevue, WA (US); Cesar A. Galindo-Legaria, Redmond, WA (US); Lubor Kollar, Redmond, WA (US); Ganapathy Subramaniam Krishnamoorthy, Issaquah, WA (US); Sameer Arun Verkhedkar, Issaquah, WA (US); Evgueni Zabokritski, Redmond, WA (US); Erik Ismert, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 11/098,949

(22) Filed: Apr. 5, 2005

(65) Prior Publication Data

US 2006/0224563 A1 Oct. 5, 2006

(51) Int. Cl.
*G06F 17/30* (2006.01)
(52) U.S. Cl. .............................. 707/2; 707/4; 707/100
(58) Field of Classification Search ................ 707/2, 707/3, 4, 100
See application file for complete search history.

(56) References Cited

U.S. PATENT DOCUMENTS

| | | | | |
|---|---|---|---|---|
| 5,812,996 A * | 9/1998 | Rubin et al. | ................... | 707/2 |
| 6,356,887 B1 * | 3/2002 | Berenson et al. | ............... | 707/2 |
| 6,366,901 B1 * | 4/2002 | Ellis | .............................. | 707/2 |
| 6,615,203 B1 * | 9/2003 | Lin et al. | ........................ | 707/3 |
| 6,985,904 B1 * | 1/2006 | Kaluskar et al. | ............ | 707/101 |
| 7,139,749 B2 * | 11/2006 | Bossman et al. | ............... | 707/3 |
| 2002/0198896 A1 | 12/2002 | Chaudhuri et al. | | |
| 2003/0225768 A1 | 12/2003 | Chaudhuri et al. | | |
| 2004/0162822 A1 * | 8/2004 | Papanyan et al. | .............. | 707/4 |
| 2004/0236762 A1 | 11/2004 | Chaudhuri et al. | | |
| 2005/0097091 A1 * | 5/2005 | Ramacher et al. | .............. | 707/3 |
| 2005/0125398 A1 * | 6/2005 | Das et al. | ........................ | 707/4 |
| 2005/0125452 A1 * | 6/2005 | Ziauddin et al. | ......... | 707/104.1 |
| 2005/0262072 A1 * | 11/2005 | Chen et al. | ..................... | 707/4 |
| 2006/0004696 A1 * | 1/2006 | Day et al. | ....................... | 707/2 |
| 2007/0106553 A1 * | 5/2007 | Jordan et al. | .................. | 705/14 |

OTHER PUBLICATIONS

Antara Ghosh, Jignashu Parikh, Vibhunti Sengar, Jayant Haristsa, Plan Selection based on Query Clustering, 2002, ACM.*

(Continued)

*Primary Examiner*—Hosain T Alam
*Assistant Examiner*—Amy Ng
(74) *Attorney, Agent, or Firm*—Workman Nydegger

(57) ABSTRACT

A system and method for creation, modification and/or use of plan guide(s) is provided. Plan guide(s) can be employed to optimize the performance of query(ies) when it is not possible and/or desirable to change the text of the query directly. Plan guides can be useful, for example, when a small subset of queries in a database application deployed from a third-party vendor is not performing as expected. Plan guides influence optimization of queries by attaching query hints to them. In accordance with an aspect of the subject invention, a query plan execution system is provided. The system includes an execution component, a query optimizer, and, a plan cache. Plan guides and other associated metadata are stored in a plan guide metadata store.

12 Claims, 10 Drawing Sheets

OTHER PUBLICATIONS

Timos K. Sellis, Multiple Query Optimization, ACM Transactions on Database Systems, vol. 13, No. 1, Mar. 1988, pp. 23-52.*

Execution Plan Caching and Reuse, Microsoft.com Library, SQL Server Architecture, http://www.msdn.microsoft.com/library/en-us/architec/8_ar_sa_4azp.asp?frame=true, last viewed Aug. 10, 2005.

Arun Marathe, Batch Compilation, Recompilation, and Plan Caching Issues in SQL Server 2005, http://www.microsoft.com/technet/prodtechnol/sql/2005/recomp.mspx, last viewed Aug. 10, 2005.

Oracle9i, SQL Reference, Release 2 (9.2), Oct. 2002, pp. 48-51.

* cited by examiner

QUERY PLAN SELECTION CONTROL USING RUN-TIME ASSOCIATION MECHANISM

TECHNICAL FIELD

The subject invention relates generally to computer databases, and, more particularly, to control of query plan selection using a run-time association mechanism.

BACKGROUND OF THE INVENTION

Queries in database systems are posed in high level, declarative (non-procedural) languages that are translated into a procedural execution plan. Many relational database management systems employ query optimizers in order to choose a query plan for a given query. The purpose of query optimization is to explore the manners in which this declarative request can be translated into procedural plans and to select the most efficient plan among those explored. The desired query execution plan can consist of a series of primitive database operators, and is typically selected according to a least estimated execution cost.

Conventional query optimizers perform well for the vast majority of time in large independent software vendor (ISV) application deployments. These applications can contain a large quantity of queries (e.g., upwards of 60,000 queries). In large ISV deployments, there are some queries, typically no more than 50 even in the largest deployments, which perform poorly because they are optimized with non-representative or non-worst-case parameter values. These parameterized queries come from prepare-execute-style execution and/or from stored procedures.

For example, a typical bad scenario is one in which a plan based on unusual parameter value (e.g., "sales for the Iceland subsidiary") is saved in the database system's query plan cache, and then used for a long period of time even as the query is run with other parameter values that need a different plan to run efficiently (e.g., "sales for the US subsidiary").

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention relates to the creation, modification and/or use of plan guide(s). Plan guide(s) can be employed to optimize the performance of query(ies) when it is not possible and/or desirable to change the text of the query directly. Plan guides can be useful, for example, when a small subset of queries in a database application deployed from a third-party vendor is not performing as expected. Plan guides can influence optimization of queries by attaching query hints to them.

Queries that can benefit from plan guides are usually parameter-based, and may be performing poorly because they use cached query plans whose parameter values do not represent a worst-case, or most representative, scenario. The OPTIMIZE FOR and RECOMPILE query hints can be used to address this problem. OPTIMIZE FOR instructs the system to use a particular value for a parameter when the query is optimized. RECOMPILE instructs the server to discard a query plan after execution, forcing the query optimizer to recompile a new query plan the next time the same query is executed.

In accordance with an aspect of the subject invention, a query plan execution system is provided. The system includes an execution component, a query optimizer, and, a plan cache. Plan guides and other associated metadata are stored in a plan guide metadata store.

Plan guide(s) can be employed to ensure, for example, that a particular query is always compiled with a particular parameter in order to avoid unexpected caching of plans for atypical parameter value(s), without the need to change the application program. For example, plan guide(s) can be of type Object, SQL and/or template.

Type "object" indicates "statement_text" appears in the context of a Transact-SQL stored procedure, scalar function, multi-statement table-valued function, or Transact-SQL data manipulation language (DML) trigger in the current database. Type "SQL" indicates "statement_text" appears in the context of a stand-alone statement or batch that can be submitted to the execution environment through any mechanism. Transact-SQL statements submitted by common language runtime (CLR) objects and/or extended stored procedures, or using EXEC N'sql_string', are processed as batches on the server, and therefore should be identified as @type='SQL'. Finally, type "template" indicates the plan guide applies to any query that parameterizes to the form indicated in statement_text.

The execution component matches plan guides of type Object to queries that appear inside the stored procedure, trigger, and/or function (module) named in the @module_or_batch argument of a create plan guide statement. If a plan guide exists on the module, it is matched to the specified query.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
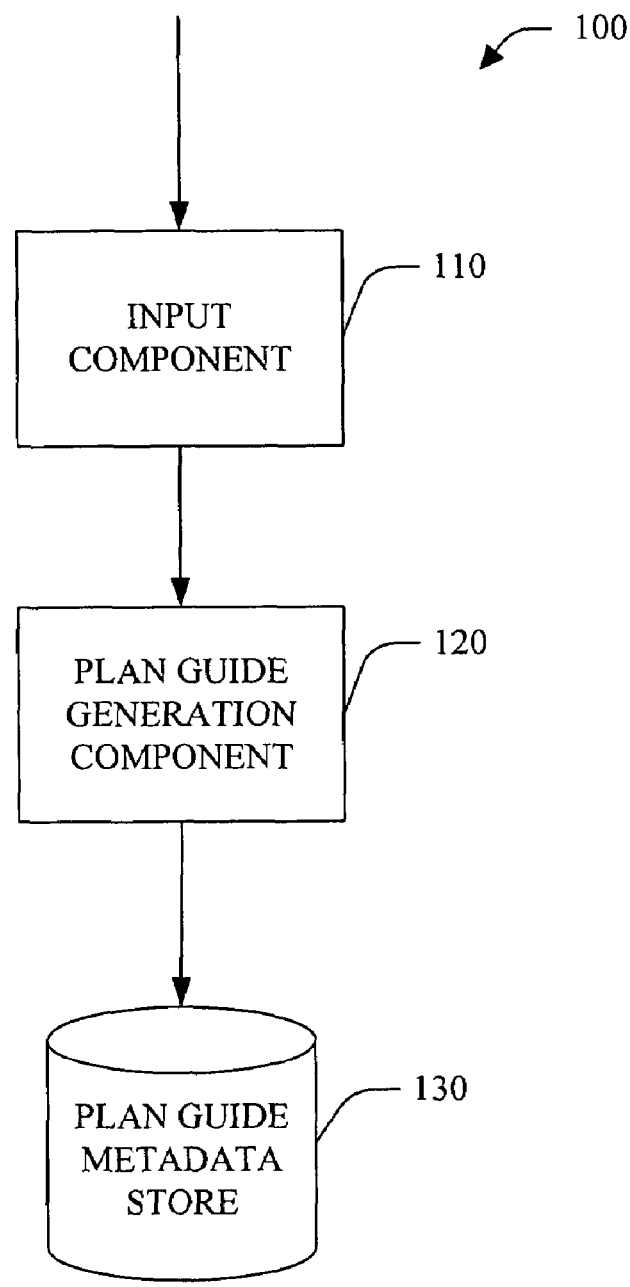
FIG. 1 is a block diagram of a plan guide creation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

The subject invention relates to the creation, modification and/or use of plan guide(s). Plan guide(s) can be employed to optimize the performance of query(ies) when it is not possible and/or desirable to change the text of the query directly. Plan guides can be useful when a small subset of queries in a database application deployed from a third-party vendor is not performing as expected. Plan guides can influence optimization of queries by attaching query hints to them.

Queries that can benefit from plan guides are usually parameter-based, and may be performing poorly because they use cached query plans whose parameter values do not represent a worst-case, or most representative, scenario. The OPTIMIZE FOR and RECOMPILE query hints can be used to address this problem. OPTIMIZE FOR instructs the system to use a particular value for a parameter when the query is optimized. RECOMPILE instructs the server to discard a query plan after execution, forcing the query optimizer to recompile a new query plan the next time the same query is executed.

Referring to FIG. 1, a plan guide creation system 100 in accordance with an aspect of the subject invention is illustrated. Plan guide(s) created by the system 100 can be employed to ensure, for example, that a particular query is compiled with a particular parameter in order to avoid unexpected caching of plans for atypical parameter value(s), without the need to change the application program.

For example, with a conventional system, a plan based on an unusual parameter value (e.g., "sales for the Iceland subsidiary") can be saved in the database system's query plan cache. The plan can then used for a long period of time even as the query is run with other parameter values that need a different plan to run efficiently (e.g., "sales for the US subsidiary").

A plan guide created by the system 100 can ensure, in this example, that this query is compiled with the parameter "US", avoiding unexpected caching of plans for atypical parameter values, without the need to change the application program. This can be significant since, in this example, the application was purchased from an ISV and, as such, it is not possible for the customer who deploys the application to change it.

The system 100 includes an input component 110 that receives a request to generate a plan guide. The system 100 further includes a plan guide generation component 120 that generates the plan guide based, at least in part, upon information received by the input component 110. The plan guide generation component 120 stores the plan guide and other associated metadata in the plan guide metadata store 130.

In one example, the plan guide generation component 120 can include a stored procedure for creating plan guides. In this example, the query to be optimized and the OPTION clause containing the query hint(s) to use to optimize the query are specified in the stored procedure statement. When the query executes, the execution environment matches the query to the plan guide and attaches the OPTION clause to the query at run time, as discussed in greater detail below.

For example, the plan guide generation component 120 can include an sp_create_plan_guide stored procedure that creates a plan guide for associating query hint(s) with queries in a database:

```
sp_create_plan_guide [ @name = ] N'plan_guide_name'
   , [ @stmt = ] N'statement_text'
   , [ @type = ] N' { OBJECT | SQL | TEMPLATE }'
   , [ @module_or_batch = ]
      {
              N'[ schema_name.]object_name'
         | N'batch_text'
         | NULL
      }
   , [ @params = ] { N'@parameter_name data_type [,...n ]' | NULL }
   , [ @hints = ] { N'OPTION ( query_hint [,...n ] )' | NULL }
```

In this example, [@name=] N'plan_guide_name' specifies a name to identify the plan guide. For example, plan guide names can be scoped to the current database. In this example, "plan_guide_name" must conform to the rules for identifiers and cannot begin with "#".

[@stmt=] N'statement_text' is a Transact-SQL statement against which to create a plan guide. When the query optimizer recognizes a query that matches statement_text, plan_guide_name takes effect. In this example, "statement_text" must appear in the context specified by the @type, @module_or_batch, and @parms arguments for plan guide creation to succeed. "statement_text" must be provided in a way that allows the execution environment to match it with the corresponding statement supplied within the batch or module identified by the @module_or_batch and @params arguments. Further, "statement_text" can be converted to a standard internal form before the execution environment attempts this match (e.g., white space, comments, and/or keyword case are not significant).

Next, @type is the type of entity in which statement_text appears, specifying the context for matching statement_text to plan_guide_name. In this example, the type of entity can be object, SQL and/or template, as discussed in greater detail below. Object indicates "statement_text" appears in the context of a Transact-SQL stored procedure, scalar function, multi-statement table-valued function, or Transact-SQL data manipulation language (DML) trigger in the current database. SQL indicates "statement_text" appears in the context of a stand-alone statement or batch that can be submitted to the execution environment through any mechanism. Transact-SQL statements submitted by common language runtime (CLR) objects and/or extended stored procedures, or using EXEC N'sql_string', are processed as batches on the server, and therefore should be identified as @type='SQL'. Finally, template indicates the plan guide applies to any query that parameterizes to the form indicated in statement_text. If template is specified, then only the PARAMETERIZATION {FORCED|SIMPLE} query hint can be specified in the @hints argument.

@module_or_batch specifies either the name of the object in which statement_text appears, or the batch text in which statement_text appears. In one example, for a plan guide to match a batch submitted from an application, batch_text must be provided in the exact same format, character-for-character, as it is submitted to execution environment. No internal conversion is done to facilitate this match. However, in another example, internal conversion is done to facilitate this match. [schema_name.]object_name specifies the name of a Transact-SQL stored procedure, scalar function, multi-statement table-valued function, or Transact-SQL DML trigger containing statement_text. If schema_name is not specified, schema_name defaults to the schema of the current user. If NULL is specified and @type='SQL', the value of @module_or_batch is set to the value of @stmt. If not specified, NULL is the default.

@params specifies the definitions of parameters that are embedded in statement_text. In this example, @params applies only when:

@type='SQL' or 'TEMPLATE'; and/or, statement_text is submitted using sp_executesql and a value for the @params argument is specified, or the execution environment submits a statement internally after parameterizing it. Submission of parameterized queries from database APIs, including DBLib, ODBC, OLE DB, and ADO, appear to the execution environment as calls to sp_executesql, so they can be matched by SQL or TEMPLATE plan guides as well.

In this example, @parameter_name data_type must be supplied in the exact same format as it is submitted to the execution environment via sp_executesql or submitted internally after parameterization. "n" indicates more than one @parameter_name data_type can be specified. In this example, if the batch does not contain parameters, NULL must be specified. The size of @params is limited only by available server memory.

Next, @hints specifies an OPTION clause to attach to a query that matches @stmt. In this example, @hints must be syntactically the same as an OPTION clause on a SELECT statement, and can contain any valid sequence of query hints. NULL indicates no OPTION clause.

In order for plan guides that specify @type='SQL' or @type='TEMPLATE' to match a query successfully, the values for batch_text and @parameter_name data_type [, . . . n] must be provided in exactly the same format as their counterparts submitted by the application (e.g., batch text provided exactly as the execution environment compiler receives it).

In one example, when the execution environment matches the value of statement_text to batch_text and @parameter_name data_type [, . . . n]or, if @type='OBJECT', to the text of the corresponding query inside object_name, the following string elements are not considered:

"White space characters (e.g., tabs, spaces, carriage returns and/or line feeds) inside the string;

Comments (-- . . . , /* . . . */); and

Trailing semicolons.

For example, the execution environment can match the statement_text string N'SELECT * FROM T WHERE a=10' to the following batch_text:

N'SELECT *

FROM T

WHERE a=10'

However, in this example, the same string would not be matched to the following batch_text:

N'SELECT * FROM T WHERE b=10'

The execution environment ignores the carriage return, line feed, and space characters inside the first query. In the second query, the sequence WHERE b=10 is interpreted differently from WHERE a=10. Matching is case- and accent-sensitive (e.g., even when the collation of the database is case-insensitive), except in the case of keywords, where case is insensitive. Matching is insensitive to shortened forms of keywords. For example, the keywords EXECUTE, EXEC, and execute are considered equivalent.

In this example, only one plan guide can be created for a particular @module_or_batch and @stmt combination. Additionally, plan guides cannot be created against stored procedures, functions, and/or DML triggers that specify the WITH ENCRYPTION clause. Further, plan guides cannot be created that reference temporary objects.

In another example, attempting to drop and/or alter a function, stored procedure, or DML trigger referenced by a plan guide, either enabled or disabled, results in an error. Attempting to drop a table with a trigger defined on it that is referenced by a plan guide also results in an error.

To create a plan guide of type OBJECT (e.g., by specifying @type='OBJECT'), the requesting entity must, at a minimum, have ALTER permission on the referenced object. To create a plan guide of type SQL or TEMPLATE, the requesting entity must have ALTER permission on the current database.

For example, the system 100 can be employed to create plan guides to match query(ies) that are executed in different contexts. First, an object plan guide matches queries that execute in the context of Transact-SQL stored procedures, scalar functions, multi-statement table-valued functions, and/or Data Manipulation Language (DML) triggers. Next, a SQL plan guide matches queries that execute in the context of stand-alone Transact-SQL statements and batches that are not part of a database object. SQL-based plan guides can also be used to match queries that parameterize to a specified form. Finally, a template-based plan guide matches stand-alone queries that parameterize to a specified form, and are used to override the current parameterization database SET option of a database for a class of queries.

Object Plan Guides

In one example, the following stored procedure, which takes an @Country parameter, exists in a database application deployed against the AdventureWorks database:

```
CREATE PROCEDURE Sales.GetSalesOrderByCountry
  (@Country nvarchar(60))
AS
BEGIN
  SELECT *
  FROM Sales.SalesOrderHeader h, Sales.Customer c,
    Sales.SalesTerritory t
  WHERE h.CustomerID = c.CustomerID
    AND c.TerritoryID = t.TerritoryID
    AND CountryRegionCode = @Country
END
```

The administrator of the AdventureWorks database observes that this stored procedure has been compiled and optimized for @Country=N'AU' (Australia). However, there are relatively few sales orders originating from Australia. Performance suffers when the query executes using parameter values of countries with more sales orders. Since the country where the most sales orders originate is the US, a query plan that is generated for @Country=N'US' generally will perform better (e.g., for all possible values of the @Country parameter).

Modifying the stored procedure by adding The OPTIMIZE FOR query hint to the query can address this problem, but since the stored procedure is in a deployed application, the database administrator cannot modify its code directly. However, using the system 100, the database administrator can create the following plan guide in the AdventureWorks database stored in the plan guide metadata store 130:

```
sp_create_plan_guide N'Guide1',
  N'SELECT *
    FROM Sales.SalesOrderHeader h,
      Sales.Customer c,
      Sales.SalesTerritory t
    WHERE h.CustomerID = c.CustomerID
      AND c.TerritoryID = t.TerritoryID
      AND CountryRegionCode = @Country',
  N'OBJECT',
  N'Sales.GetSalesOrderByCountry',
  NULL,
  N'OPTION (OPTIMIZE FOR (@Country = N"US"))'
```

When the query specified in the create plan guide stored procedure statement executes, the query is modified before optimization to include the OPTIMIZE FOR (@Country=N'US') clause also specified.

SQL Plan Guides

SQL plan guides can apply, for example, to statements and batches that are often submitted by an application through the sp_executesql system stored procedure. For example, an exemplary stand-alone batch:

```
USE AdventureWorks
UPDATE Sales.SalesOrderHeader
SET DueDate = DATEADD(dd,1,DueDate)
WHERE SalesOrderID = @p
SELECT * FROM Sales.SalesOrderHeader h, Sales.SalesOrderDetail d
WHERE h.SalesOrderID = d.SalesOrderID
  AND h.SalesOrderID = @p
```

The database administrator observes that the SELECT statement in the batch is optimized for a non-representative value of the @p parameter. Therefore, it is desirable to have the SELECT batch to recompile each time it executes by attaching the RECOMPILE query hint to it. The following plan guide can be generated by the system 100 to accomplish this task:

```
sp_createplanguide N'Guide2',
  N'SELECT *
  FROM Sales.SalesOrderHeader h, Sales.SalesOrderDetail d
  WHERE h.SalesOrderID = d.SalesOrderID
    AND h.SalesOrderID = @p',
  N'SQL',
  N'USE AdventureWorks
  UPDATE Sales.SalesOrderHeader
  SET DueDate = DATEADD(dd,1,DueDate)
  WHERE SalesOrderID = @p
  SELECT * FROM Sales.SalesOrderHeader h, Sales.SalesOrderDetail d
  WHERE h.SalesOrderID = d.SalesOrderID
    AND h.SalesOrderID = @p',
  N'@p int',
  N'OPTION (recompile)'
```

As discussed in greater detail below, in one example, the values supplied for the @module, @batch and/or @params arguments of the create plan guide stored procedure must match the corresponding text exactly as submitted in the actual query. In another example, the values are normalized.

SQL plan guides can also be created on queries that parameterize to the same form when the PARAMETERIZATION database option is SET to FORCED, or when a TEMPLATE plan guide is created specifying that a class of queries be parameterized.

Template Plan Guides

Template plan guides can be used to override the parameterization behavior for specific query forms. For example, a template plan guide can generated in these situations:

The PARAMETERIZATION database option is SET to FORCED, but there are queries you do not want parameterized when compiled.

The PARAMETERIZATION database option is SET to SIMPLE (the default setting), but you want a class of queries to be parameterized. In other words, you want to enable parameterization on just a subset of queries.

Template plans guides can further be employed in conjunction with SQL plan guides. For example, a template plan guide can be created to ensure a class of queries is parameterized. Thereafter, a SQL plan guide can be created on the parameterized form of that query.

Creation of Exemplary Plan Guides

Creating a Plan Guide of Type Object for a Query in a Stored Procedure

The plan guide generation component 120 can be employed to create a plan guide of type Object for a query in a stored procedure. In this example, the plan guide generation component 120 creates a plan guide that matches a query executed in the context of an application-based stored procedure, and applies the OPTIMIZE FOR hint to the query. For example, an exemplary stored procedure is:

```
CREATE PROCEDURE Sales.GetSalesOrderByCountry
  (@Country nvarchar(60))
AS
BEGIN
  SELECT *
```

-continued

```
    FROM Sales.SalesOrderHeader h, Sales.Customer c,
       Sales.SalesTerritory t
    WHERE h.CustomerID = c.CustomerID
       AND c.TerritoryID = t.TerritoryID
       AND CountryRegionCode = @Country
END
```

A plan guide can be generated by the system 100, for example, by invoking the sp_create_plan_guide stored procedure, as follows:

```
sp_create_plan_guide N'Guide1',
   N'SELECT *
     FROM Sales.SalesOrderHeader h,
       Sales.Customer c,
       Sales.SalesTerritory t
     WHERE h.CustomerID = c.CustomerID
       AND c.TerritoryID = t.TerritoryID
       AND CountryRegionCode = @Country',
   N'OBJECT',
   N'Sales.GetSalesOrderByCountry',
   NULL,
   N'OPTION (OPTIMIZE FOR (@Country = N"US"))'
```

Creating a Plan Guide of Type SQL for a Stand-Alone Query

The plan guide generation component 120 can be employed to create a plan guide of type SQL for a query in a stored procedure. In this example, the system 100 is employed to create a plan guide to match a query in a batch submitted by an application through the sp_executesql system stored procedure. An exemplary batch follows:

```
USE AdventureWorks
UPDATE Sales.SalesOrderHeader
SET DueDate = DATEADD(dd,1,DueDate)
WHERE SalesOrderID = @p
SELECT * FROM Sales.SalesOrderHeader h, Sales.SalesOrderDetail d
WHERE h.SalesOrderID = d.SalesOrderID
   AND h.SalesOrderID = @p
```

The database administrator observes that the SELECT statement in the batch is optimized for a non-representative value of the @p parameter, and the resulting query plan is stored in the procedure cache, adversely affecting the performance of subsequent executions of the query. Therefore, the database administrator would like the SELECT statement to recompile each time it executes by attaching the RECOMPILE query hint to it. In accordance with an aspect of the subject invention, the system 100 can be employed to generate a plan guide to accomplish this task, for example:

```
sp_create_plan_guide N'Guide2',
N'SELECT *
FROM Sales.SalesOrderHeader h, Sales.SalesOrderDetail d
WHERE h.SalesOrderID = d.SalesOrderID
   AND h.SalesOrderID = @p',
N'SQL',
N'USE AdventureWorks
UPDATE Sales.SalesOrderHeader
SET DueDate = DATEADD(dd,1,DueDate)
WHERE SalesOrderID = @p
SELECT * FROM Sales.SalesOrderHeader h, Sales.SalesOrderDetail d
WHERE h.SalesOrderID = d.SalesOrderID
```

-continued

```
   AND h.SalesOrderID = @p',
N'@p int',
N'OPTION (RECOMPILE)'
```

Creating a Plan Guide of Type Template for the Parameterized Form of a Query

A plan guide that matches a query that parameterizes to a specified form and directs the execution environment to force parameterization of the query can be generated by the plan guide generation component 120. The following two queries are syntactically equivalent, differing only in their constant literal values:

```
SELECT * FROM AdventureWorks.Sales.SalesOrderHeader h,
AdventureWorks.Sales.SalesOrderDetail d WHERE h.SalesOrderID =
d.SalesOrderID AND h.SalesOrderID = 45639
SELECT * FROM AdventureWorks.Sales.SalesOrderHeader h,
AdventureWorks.Sales.SalesOrderDetail d WHERE h.SalesOrderID =
d.SalesOrderID AND h.SalesOrderID = 45640
```

The system 100 can generate a plan guide on the parameterized form of the query through the stored procedure sp_create_plan_guide as follows:

```
sp_create_plan_guide @name = N'TemplateGuide1',
@stmt = N'SELECT * FROM AdventureWorks.Sales.
SalesOrderHeader h,
AdventureWorks.Sales.SalesOrderDetail d WHERE h.SalesOrderID =
d.SalesOrderID AND h.SalesOrderID = @0',
@type = N'TEMPLATE',
@module_or_batch = NULL,
@params = N'@0 int',
@hints = N'OPTION(PARAMETERIZATION FORCED)'
```

In the above example, the value for the @stmt argument is the parameterized form of the query. The following script can be used both to obtain the parameterized query and then create a plan guide on it:

```
DECLARE @stmt nvarchar(max)
DECLARE @params nvarchar(max)
EXEC sp_get_query_template N'SELECT * FROM
AdventureWorks.Sales.SalesOrderHeader h,
AdventureWorks.Sales.SalesOrderDetail d WHERE h.SalesOrderID =
d.SalesOrderID AND h.SalesOrderID = 45639',
@stmt OUTPUT,
@params OUTPUT
EXEC sp_create_plan_guide N'TemplateGuide1',
@stmt,
N'TEMPLATE',
NULL,
@params,
N'OPTION(PARAMETERIZATION FORCED)'
```

In one example, the value of the constant literals in the @stmt parameter passed to sp_get_query_template may affect the data type chosen for the parameter that replaces the literal which can affect plan guide matching. In this situation, the user (e.g., database administrator) may have to create more than one plan guide to cover different parameter value ranges.

Designing and Implementing Plan Guides

In one example, plan guides are scoped to the database in which they are created. Therefore, in this example, only plan guides that exist in the database that is current when a query executes can be matched to the query. For example, if AdventureWorks is the current database, and the following query executes SELECT * FROM Person.Contact Only plan guides in the AdventureWorks database are eligible to be matched to this query.

However, if AdventureWorks is the current database, and the following query executes:

USE DB1

SELECT * FROM Person.Contact

Only plan guides in DB1 are eligible to be matched to the query, because the query is executing in the context of DB1.

In one example, any combination of valid query hints can be used in a plan guide. When a plan guide matches a query, the OPTION clause specified in the plan guide is added to the query before it compiles and optimizes. If a query that is matched to a plan guide already has an OPTION clause, the query hints specified in the plan guide replace those in the query. However, in this example, for a plan guide to match a query that already has an OPTION clause, the query's OPTION clause must be included when the text of the query to match is specified in the sp_create_plan_guide statement. If it is desired for the hints specified in the plan guide to be added to the hints that already exist on the query, rather than replace them, both the original hints and the additional hints in the OPTION clause of the plan guide must be specified.

Specifying Query Parameterization Behavior Using Plan Guides

As discussed previously, a template plan guide can be employed to specify whether or not a class of queries is parameterized when compiled. For example, when the PARAMETERIZATION database option is SET to SIMPLE, the execution environment query optimizer may choose to parameterize the queries, meaning that any literal values contained in the query are substituted with parameters (e.g., Simple Parameterization). When SIMPLE parameterization is in effect, the database administrator cannot control which queries are parameterized and which are not. However, the database administrator can specify that all queries in a database be parameterized by setting the PARAMETERIZATION database SET option to FORCED (e.g., Forced Parameterization).

In accordance with aspects of the subject invention, the parameterization behavior of a database can be overridden by:

When the PARAMETERIZATION database option is SET to SIMPLE, the a certain class of queries can be specified to be always parameterized by creating a TEMPLATE plan guide on the parameterized form of the query, and specifying the PARAMETERIZATION FORCED query hint in the sp_create_plan guide statement. This type of plan guide can be viewed as a way to enable forced parameterization only on a certain class of queries, rather than all queries.

When the PARAMETERIZATION database option is SET to FORCED, a certain class of queries can be specified as never parameterized by creating a TEMPLATE plan guide on the parameterized form of the query, and specifying the PARAMETERIZATION SIMPLE query hint in the sp_create_plan_guide statement.

For example, a database administrator is aware of the following query on the AdventureWorks database:

```
SELECT pi.ProductID, SUM(pi.Quantity) AS Total
FROM Production.ProductModel pm
    INNER JOIN Production.ProductInventory pi
        ON pm.ProductModelID = pi.ProductID
WHERE pi.ProductID = 101
GROUP BY pi.ProductID, pi.Quantity HAVING sum(pi.Quantity) > 50
```

The database administrator has determined that he/she does not want to enable forced parameterization on all queries in the database. However, the database administrator desires to avoid compilation costs on all queries that are syntactically equivalent to the above query, but differ only in their constant literal values. In other words, the database administrator desires the query to be parameterized so that a query plan for this type of query is reused.

To do so, the database administrator can first retrieve the parameterized form of the query by using the sp_get_query_template system stored procedure, for example:

```
DECLARE @stmt nvarchar(max)
DECLARE @params nvarchar(max)
EXEC sp_get_query_template N'SELECT pi.ProductID,
SUM(pi.Quantity) AS Total
FROM Production.ProductModel pm INNER JOIN
Production.ProductInventory pi ON
pm.ProductModelID = pi.ProductID WHERE pi.ProductID = 101
GROUP BY
pi.ProductID, pi.Quantity HAVING sum(pi.Quantity) > 50',
@stmt OUTPUT,
@params OUTPUT
```

Next, the database administrator can create the plan guide on the parameterized form of the query, specifying the PARAMETERIZATION FORCED query hint, for example:

```
sp_create_plan_guide @name = N'TemplateGuide1',
@stmt = N'SELECT pi.ProductID, SUM(pi.Quantity) AS Total FROM
Production.ProductModel pm INNER JOIN Production.ProductInventory
pi ON
pm.ProductModelID = pi.ProductID WHERE pi.ProductID = @0
GROUP BY
pi.ProductID, pi.Quantity HAVING sum(pi.Quantity) > @1',
@type = N'TEMPLATE',
@module_or_batch = NULL,
@params = N'@0 int, @1 int',
@hints = N'OPTION(PARAMETERIZATION FORCED)'
```

The following script can be used both to obtain the parameterized query and then create a plan guide on it:

```
DECLARE @stmt nvarchar(max)
DECLARE @params nvarchar(max)
EXEC sp_get_query_template N'SELECT pi.ProductID,
SUM(pi.Quantity) AS Total
FROM Production.ProductModel pm INNER JOIN
Production.ProductInventory pi ON
pm.ProductModelID = pi.ProductID WHERE pi.ProductID = 101
GROUP BY
pi.ProductID, pi.Quantity HAVING sum(pi.Quantity) > 50',
@stmt OUTPUT,
@params OUTPUT
EXEC sp_create_plan_guide N'TemplateGuide1',
@stmt,
N'TEMPLATE',
NULL,
```

-continued

```
@params,
N'OPTION(PARAMETERIZATION FORCED)'
```

Likewise, in a database in which forced parameterization is already enabled, to ensure that the sample query, and others that are syntactically equivalent except for their constant literal values, is not parameterized, PARAMETERIZATION SIMPLE instead of PARAMETERIZATION FORCED is specified in the OPTION clause.

Designing Plan Guides for Parameterized Queries

A plan guide can be created on a query that is parameterized, for example:

The query is submitted using sp_executesql;

Forced Parameterization is enabled in the database, which parameterizes all eligible queries;

A separate plan guide has been created on a class of queries to which this query belongs, specifying that they be parameterized.

When a plan guide is created on a parameterized query, a plan guide for all queries that parameterize to the same form, but differ only in their constant literal values. For example, in a database on which forced parameterization is enabled, the following two queries parameterize to the same form:

```
SELECT pi.ProductID, SUM(pi.Quantity) AS Total
FROM Production.ProductModel pm INNER JOIN
Production.ProductInventory pi ON
pm.ProductModelID = pi.ProductID
WHERE pi.ProductID = 101
GROUP BY pi.ProductID, pi.Quantity
HAVING sum(pi.Quantity) > 50
SELECT pi.ProductID, SUM(pi.Quantity) AS Total
FROM Production.ProductModel pm INNER JOIN
Production.ProductInventory pi ON
pm.ProductModelID = pi.ProductID
WHERE pi.ProductID = 101
GROUP BY pi.ProductID, pi.Quantity
HAVING sum(pi.Quantity) > 100
```

To create a plan guide on parameterized queries, a plan guide of type "SQL" is created. The parameterized for of the query is specified in the sp_create_plan guide statement. For example, to obtain the parameterized form of one of the queries in the example above, and create a plan guide on it to force the optimizer to use a hash join, first the parameterized form of the query is obtained (e.g., by executing sp_get_query_template):

```
DECLARE @stmt nvarchar(max)
DECLARE @params nvarchar(max)
EXEC sp_get_query_template N'SELECT pi.ProductID,
SUM(pi.Quantity) AS Total
FROM Production.ProductModel pm INNER JOIN
Production.ProductInventory pi ON
pm.ProductModelID = pi.ProductID WHERE pi.ProductID = 101
GROUP BY
pi.ProductID, pi.Quantity HAVING sum(pi.Quantity) > 50',
@stmt OUTPUT,
@params OUTPUT
```

Next, if the query is not already being parameterized by the execution environment through use of the sp_executesql or the PARAMETERIZATION FORCED database SET option, a plan guide of type TEMPLATE is created to force parameterization of queries with this format:

```
EXEC sp_create_plan_guide N'TemplateGuide1',
@stmt,
N'TEMPLATE',
NULL,
@params, N'OPTION(PARAMETERIZATION FORCED)'
```

Finally, a plan guide of type SQL is created on the parameterized query:

```
EXEC sp_create_plan_guide N'GeneralizedGuide1',
@stmt,
N'SQL',
NULL,
@params,
N'OPTION(HASH JOIN)'
```

The plan guide thereafter applies to queries that parameterize to the form specified, but contain different constant literal values.

Figure 2:
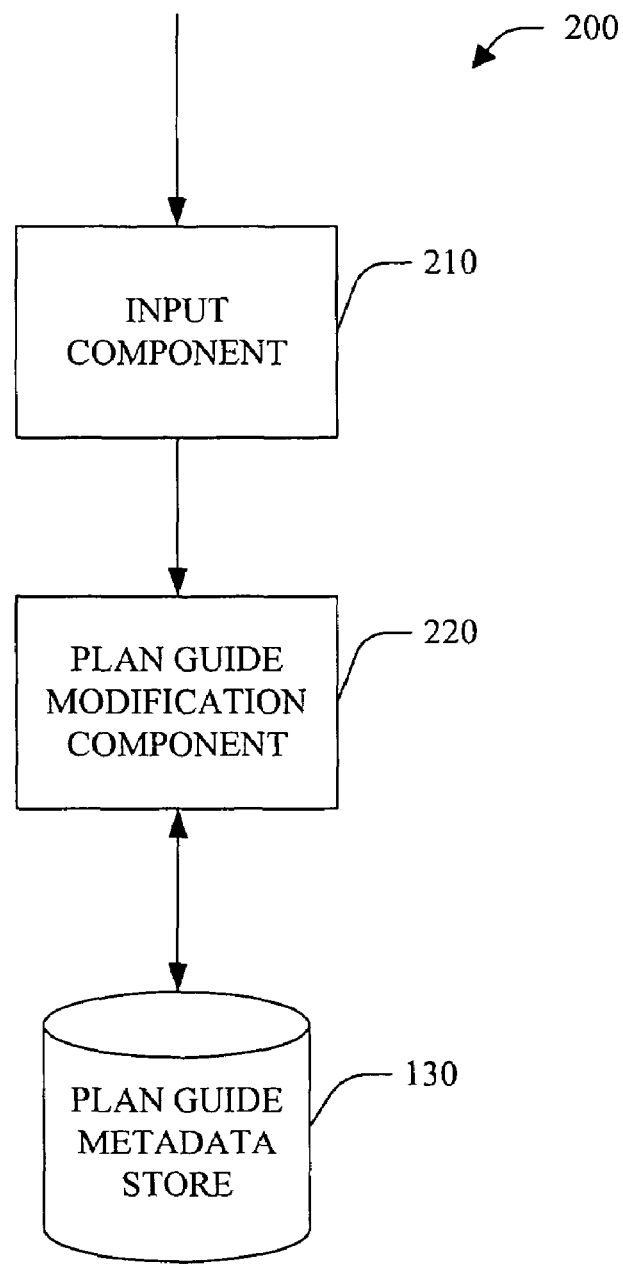
FIG. 2 is a block diagram of a plan guide modification system in accordance with an aspect of the subject invention.

Next, referring to FIG. 2, a plan guide modification system 200 in accordance with an aspect of the subject invention is illustrated. The system 200 can be employed to drop, enable and/or disable plan guide(s). The system 200 includes an input component 210 that receives information associated with a modification to a plan guide. The system 200 further includes a plan guide modification component 220 that selectively drops, enables and/or disables a particular plan guide based, at least in part, upon information received by the input component 210.

The plan guide modification component 220 can comprise a stored procedure facilitating modification of plan guide(s), for example, sp_control_plan_guide

```
sp_control_plan_guide [ @operation = ] N'<control_option>'
    [ , [ @name = ] N'plan_guide_name' ]
    <control_option>::=
    {
        DROP
        | DROP ALL
        | DISABLE
        | DISABLE ALL
        | ENABLE
        | ENABLE ALL
    }
```

Where N'plan_guide_name' specifies the plan guide to be dropped, enabled, and/or disabled. In this example, plan_guide_name is resolved to the current database. If not specified, plan_guide_name defaults to NULL.

DROP instructs the plan guide modification component 220 to drop the plan guide specified by plan_guide_name. After a plan guide is dropped, future executions of a query formerly matched by the plan guide are not influenced by the plan guide.

DROP ALL instructs the plan guide modification component 220 to drop all plan guides in the current database. In this example, N'plan_guide_name cannot be specified if DROP ALL is specified.

DISABLE instructs the plan guide modification component 220 to disable the plan guide specified by plan_ guide_name. After a plan guide is disabled, future executions of a query formerly matched by the plan guide are not influenced by the plan guide.

DISABLE ALL instructs the plan guide modification component 220 to disable all plan guides in the current database. In this example, N'plan_guide_name cannot be specified if DISABLE ALL is specified.

Similarly, ENABLE instructs the plan guide modification component 220 to enable the plan guide specified by plan_guide_name. A plan guide can be matched with an eligible query once it is enabled. In one example, plan guides are enabled by default at the time they are created.

Finally, ENABLE ALL instructs the plan guide modification component 220 to enable all plan guides in the current database. In this example, N'plan_guide_name' cannot be specified if ENABLE ALL is specified.

In one example, in order to execute sp_control_plan_guide on a plan guide of type OBJECT (created specifying @type='OBJECT'), the requestor must, at a minimum, have ALTER permission on the object referenced by the plan guide. In this example, for all other plan guides, the requester must have ALTER DATABASE permissions.

For example, first a procedure on which to define a plan guide is created:

```
IF OBJECT_ID(N'Sales.GetSalesOrderByCountry', N'P') IS NOT NULL
   DROP PROCEDURE Sales.GetSalesOrderByCountry
GO
CREATE PROCEDURE Sales.GetSalesOrderByCountry
   (@Country nvarchar(60))
AS
BEGIN
   SELECT *
   FROM Sales.SalesOrderHeader h, Sales.Customer c,
      Sales.SalesTerritory t
   WHERE h.CustomerID = c.CustomerID
      AND c.TerritoryID = t.TerritoryID
      AND CountryRegionCode = @Country;
END
GO
```

Next, a plan guide is created:

```
sp_create_plan_guide N'Guide3',
   N'SELECT *
      FROM Sales.SalesOrderHeader h,
      Sales.Customer c,
      Sales.SalesTerritory t
      WHERE h.CustomerID = c.CustomerID
         AND c.TerritoryID = t.TerritoryID
         AND CountryRegionCode = @Country',
   N'OBJECT',
   N'Sales.GetSalesOrderByCountry',
   NULL,
   N'OPTION (OPTIMIZE FOR (@Country = N"US"))'
GO
```

In order to disable the plan guide:
sp_control_plan_guide N'DISABLE', N'Guide3'
GO
To enable the plan guide:
sp_control_plan_guide N'ENABLE', N'Guide3'
GO
Further, to drop the plan guide:
sp_control_plan_guide N'DROP', N'Guide3'
Next, to disable all plan guides in the current database (e.g., AdventurWorks):
USE AdventureWorks;
GO
sp_control_plan_guide N'DISABLE ALL'

Figure 3:
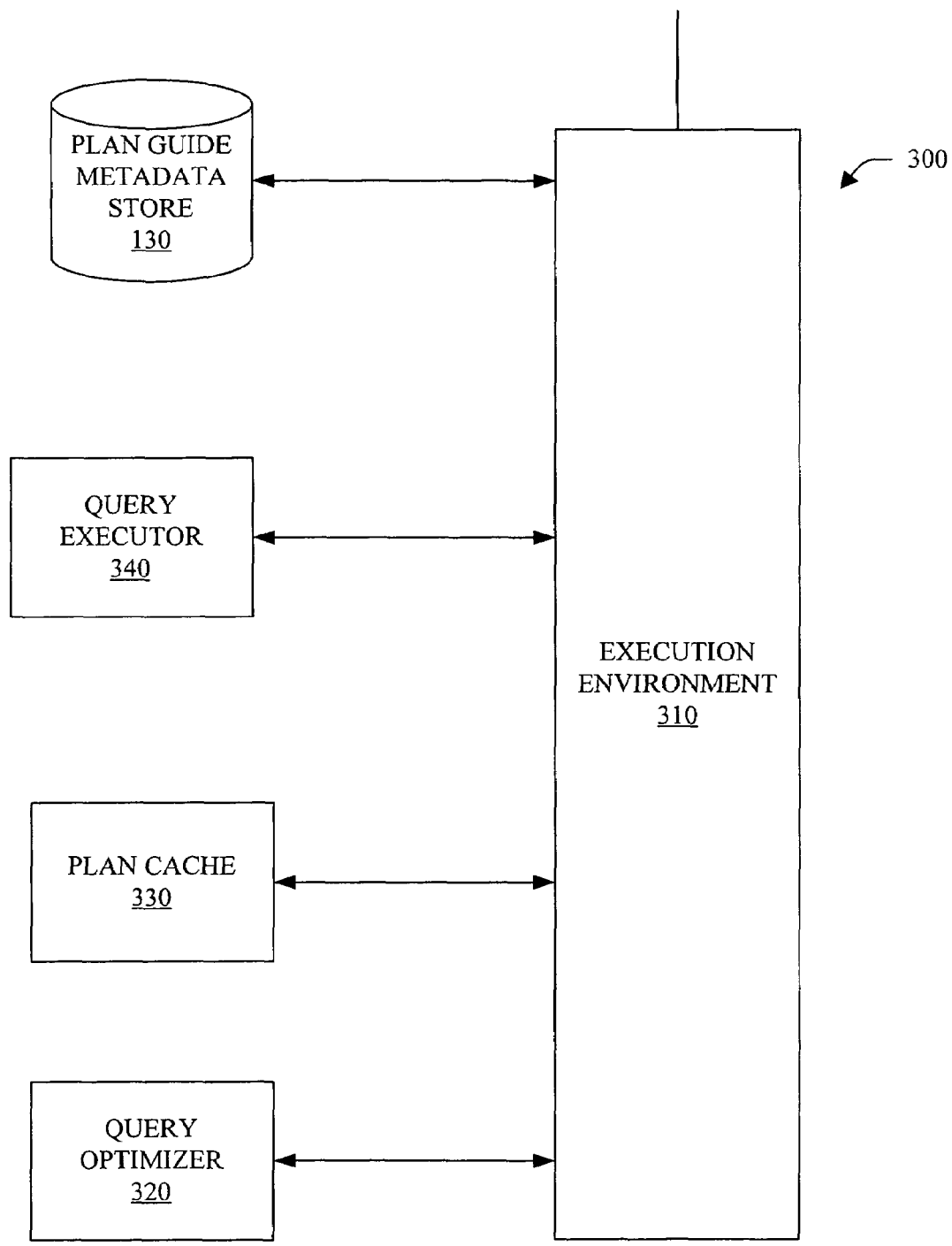
FIG. 3 is a block diagram of a query plan execution system in accordance with an aspect of the subject invention.

Turning to FIG. 3, a query plan execution system 300 in accordance with an aspect of the subject invention is illustrated. The system 300 includes an execution environment 310, a query optimizer 320, a plan cache 330, and, a query executor 340. Plan guides and other associated metadata are stored in the plan guide metadata store 130.

The execution environment 310 matches plan guides of type Object to queries that appear inside the stored procedure, trigger, and/or function (module) named in the @module_or_batch argument of the sp_create_plan_guide statement. If a plan guide exists on the module, it is matched to the specified query.

For queries submitted inside batches, the execution environment 310 matches plan guides to them by first attempting to match the query to a SQL-based plan guide, then by attempting to parameterize the query, and trying again.

For example, first the query optimizer 320 can recognize an executed batch as a request to compile each statement within the batch. Next, for a given statement within the batch, the execution environment 310 can attempt to match the statement to a SQL-based plan guide whose @module_or_batch argument matches exactly that of the incoming batch text, including any constant literal values, and whose @stmt argument also matches the statement in the batch. If such a plan guide exists and the match succeeds, the statement text is modified to include the query hints specified in the plan guide, and the statement is compiled accordingly.

However, if a plan guide is not matched to the statement, the execution environment 310 attempts to parameterize the statement using forced parameterization. In this step, parameterization can fail for any of these reasons:

1. The statement is already parameterized and/or contains local variables.
2. The PARAMETERIZATION SIMPLE database SET option is applied (the default setting), and there is no plan guide of type Template that applies to the statement and specifies the PARAMETERIZATION FORCED query hint.
3. A plan guide of type Template exists that applies to the statement and specifies the PARAMETERIZATION SIMPLE query hint.

If forced parameterization succeeds, the execution environment 310 attempts to match the parameterized form of the statement to a plan guide of type SQL created on that parameterized statement, treated as a single-statement batch. If such a plan guide exists and the match succeeds, the statement text is modified to include the query hints specified in the plan guide, and the statement is compiled accordingly. If no such plan guide is matched, the parameterized statement is compiled without first being modified by a plan guide.

If parameterization fails, the execution environment 310 attempts to parameterize the statement again, this time applying the default "simple parameterization" behavior. The resulting query is compiled directly. Plan guides are not matched to the results of simple parameterization. The query executor 340 executes the query received from the execution environment 310.

It is to be appreciated that the system 100, the input component 110, the plan guide generation component 120, the plan guide metadata store 130, the system 200, the input component 210, the plan guide modification component 220, the system 300, the execution environment 310, the query optimizer 320, the plan cache 330 and/or the query executor 340 can be computer components as that term is defined herein.

Turning briefly to FIGS. 4-8, methodologies that may be implemented in accordance with the subject invention are illustrated. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
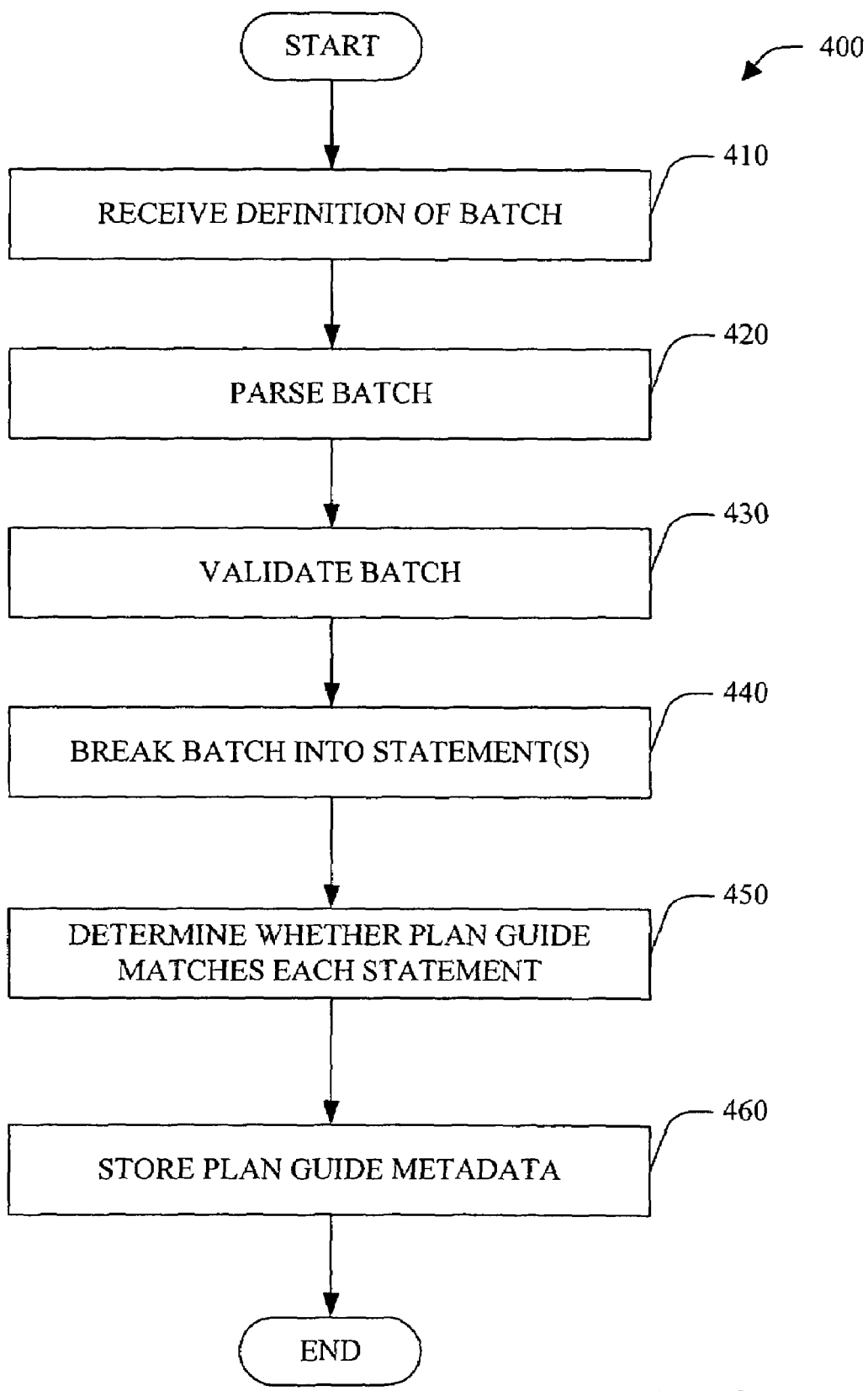
FIG. 4 is a flow chart of a method of generating a plan guide for a batch of query text in accordance with an aspect of the subject invention.

Referring to FIG. 4, a method of generating a plan guide for a batch of query text 400 in accordance with an aspect of the subject invention is illustrated. At 410, a definition of a batch is received. At 420, the batch is parsed. At 430, the batch is validated.

At 440, the batch is broken into statement(s). At 450, a determination is made as to whether a plan guide matches each statement (e.g., normalized match). At 460, the plan guide and associated metadata (e.g., record matching statement(s)) are stored.

Figure 5:
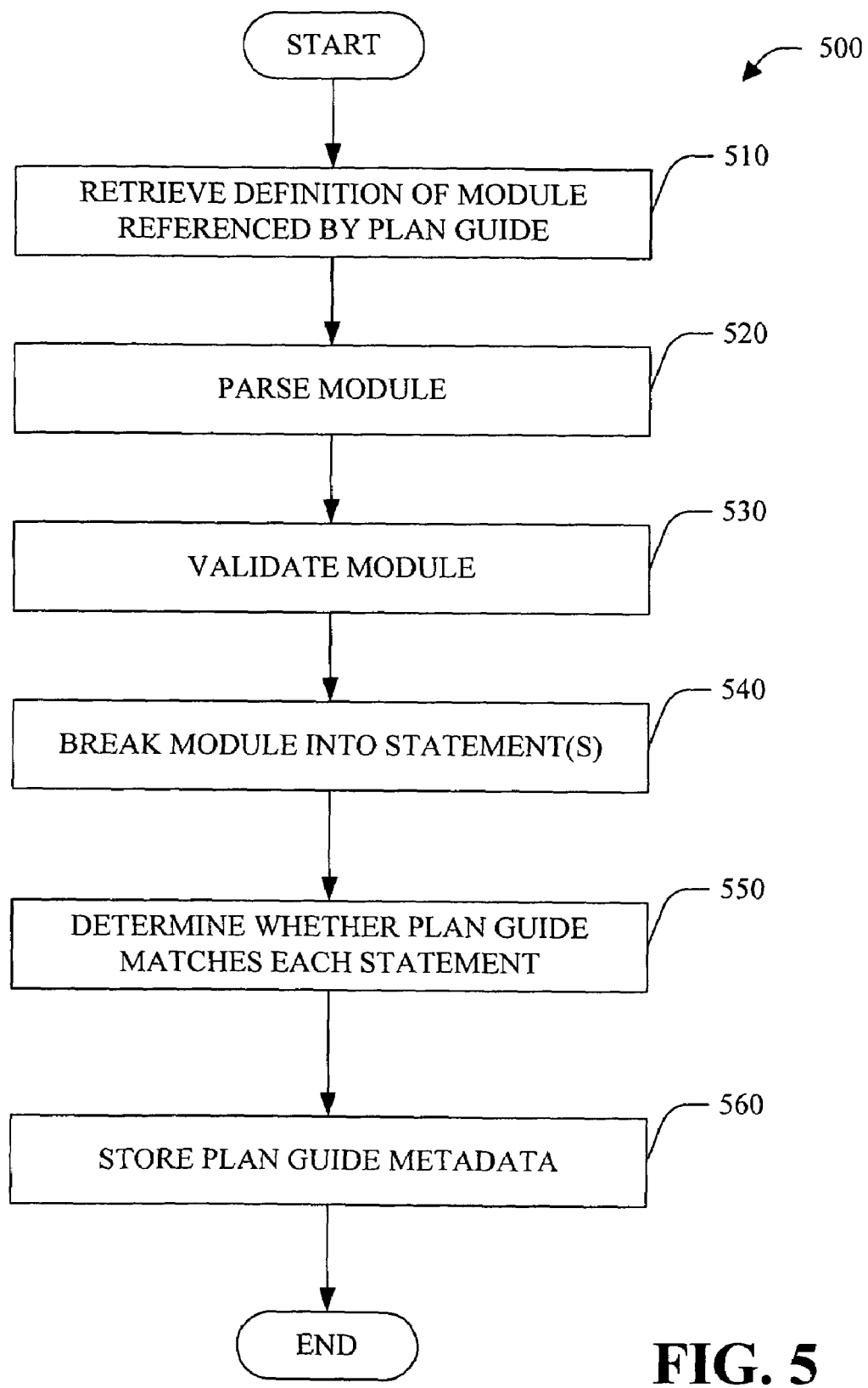
FIG. 5 is a flow chart of a method of generating a plan guide for a stored procedure/other module in accordance with an aspect of the subject invention.

Next, turning to FIG. 5, a method of generating a plan guide for a stored procedure/other module 500 in accordance with an aspect of the subject invention is illustrated. At 510, a definition of a module referenced by a plan guide is retrieved (e.g., from module metadata). At 520, the module is parsed. At 530, the module is validated.

At 540, the module is broken into statement(s). At 550, a determination is made as to whether a plan guide matches each statement (e.g., normalized match). At 560, the plan guide and associated metadata are stored.

Figure 6:
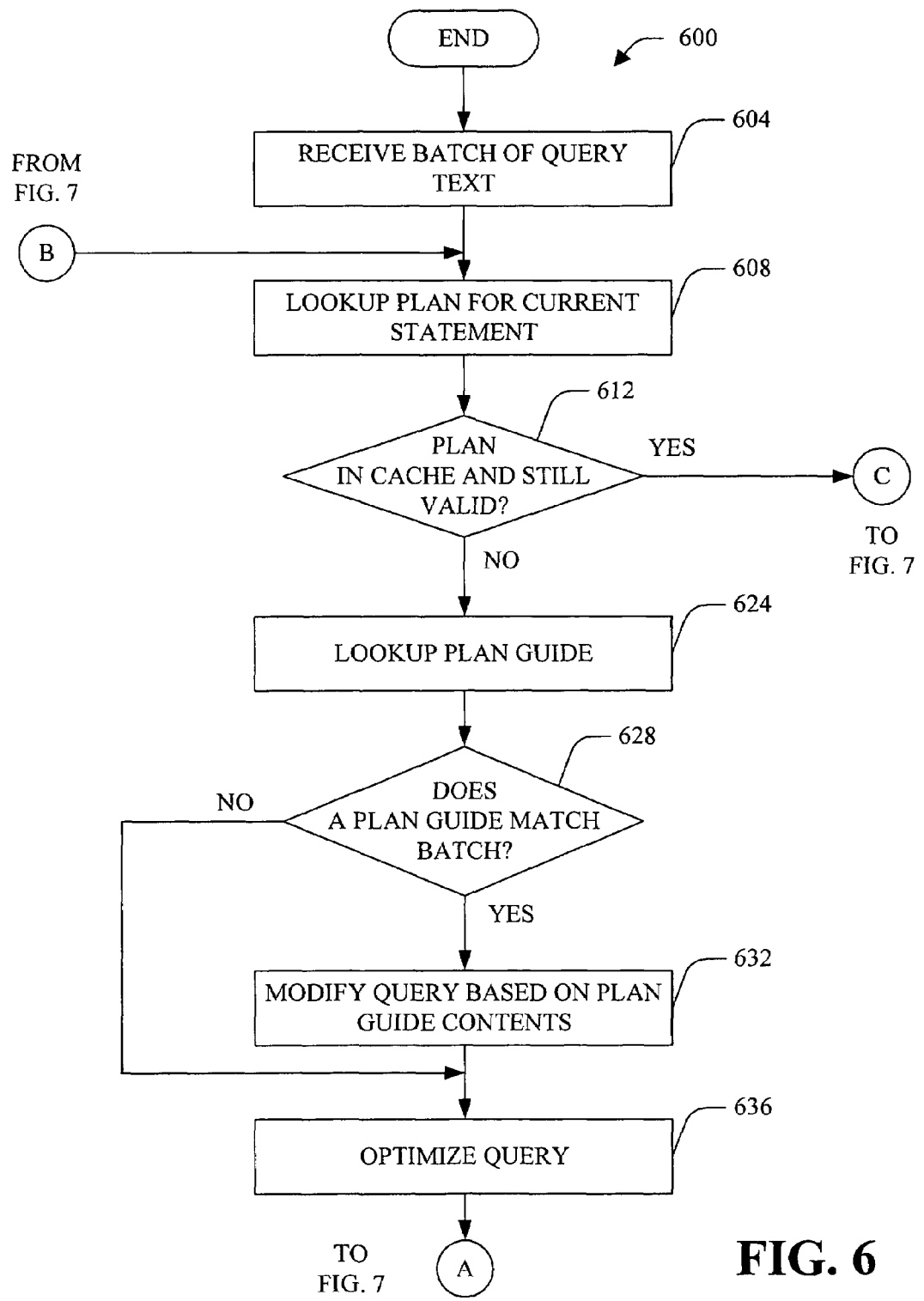
FIG. 6 is a flow chart of a method of using plan guides for a batch of query text in accordance with an aspect of the subject invention.
Figure 7:
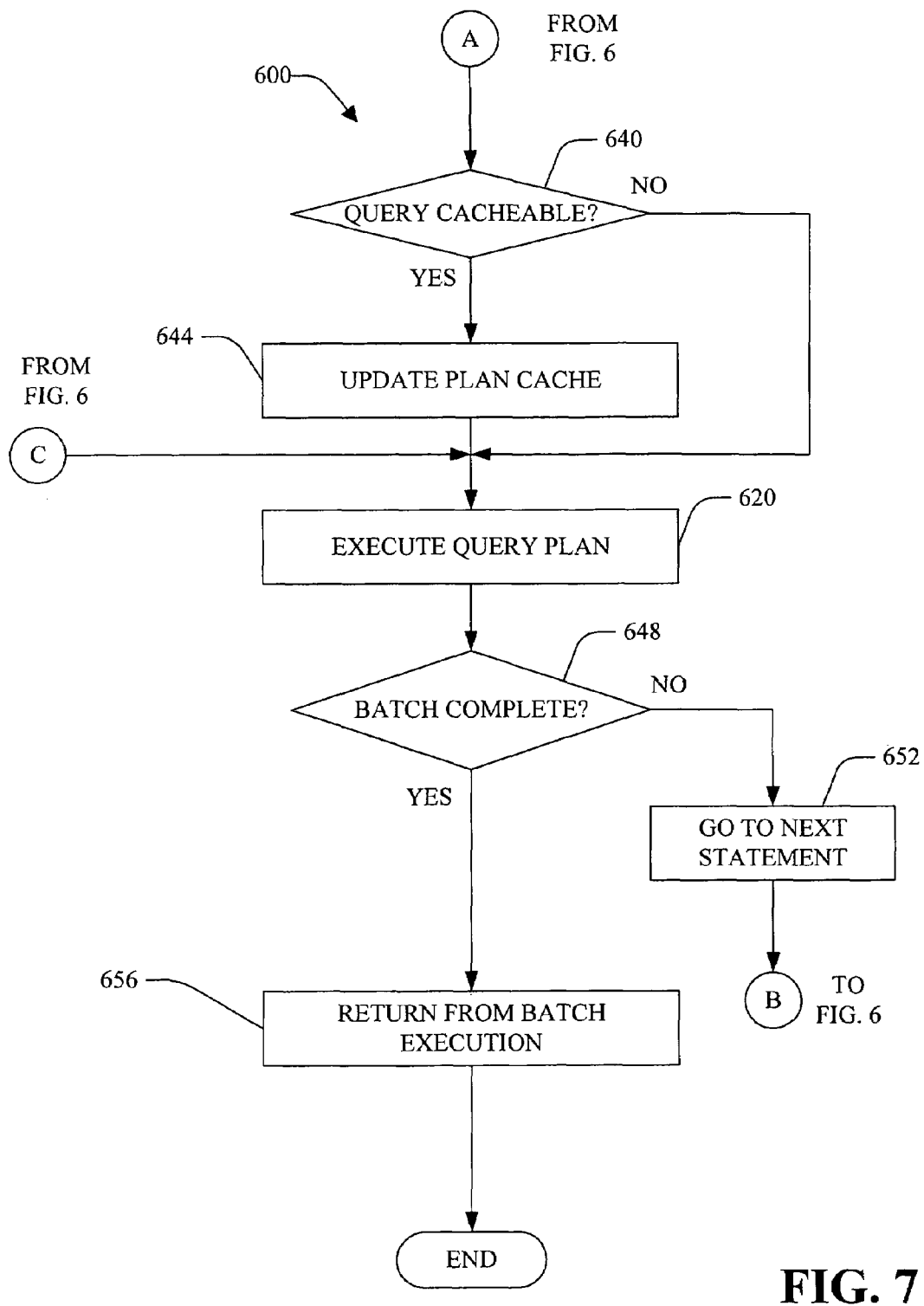
FIG. 7 is a flow chart further illustrating the method of FIG. 6.

Referring next to FIGS. 6 and 7, a method of using plan guides for a batch of query text 600 in accordance with an aspect of the subject invention is illustrated. At 604, a batch of query text is received. At 608, a plan for the current statement is looked up. At 612, a determination is made as to whether a plan is in the cache for the statement and still valid. If the determination at 612 is YES, processing continues at 616. If the determination at 612 is NO, at 624, a plan guide for the statement is looked up (e.g., normalized match).

At 628, a determination is made as to whether a plan guide matches the batch statement. If the determination at 628 is YES, at 632, the query is modified based on the plan guide contents, and, processing continues at 636. If the determination at 628 is NO, at 636, the query is optimized.

Next, at 640, a determination is made as to whether the query is cacheable. If the determination at 640 is YES, at 644, the plan cache is updated with the query plan, and, processing continues at 620. If the determination at 640 is NO, at 620, the query plan is executed.

At 648, a determination is made as to whether the batch is complete. If the determination at 648 is NO, at 652, the next statement is retrieved as the current statement, and, processing continues at 608. If the determination at 648 is YES, at 656, the execution environment returns from batch execution, and, no further processing occurs.

Figure 8:
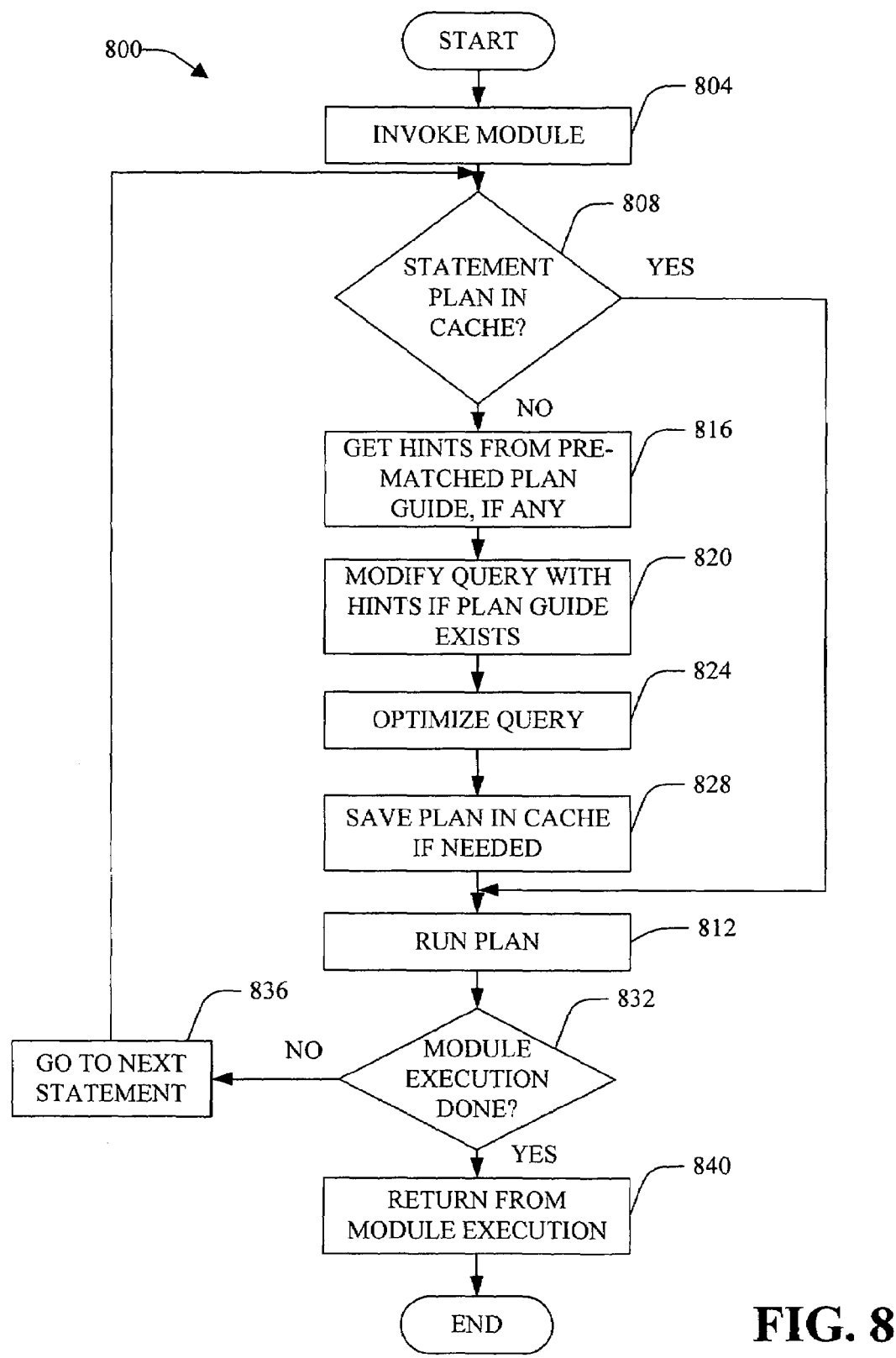
FIG. 8 is a flow chart of a method of using plan guides for a stored procedure/other module in accordance with an aspect of the subject invention.

Turning to FIG. 8, a method of using plan guides for a stored procedure/other module 800 in accordance with an aspect of the subject invention is illustrated. At 804, the stored procedure/module is invoked. At 808, a determination is made as to whether a plan for the statement exists in the plan cache. If the determination at 808 is YES, processing continues at 812. If the determination at 808 is NO, at 816, hint(s) are obtained from a pre-matched plan guide, if one exists.

Next, at 820, the query is modified with hint(s), if the plan guide exists. At 824, the query is optimized. At 828, the query plan is saved in the plan cache, if needed. At 812, the query plan is run.

At 832, a determination is made as to whether module execution is done. If the determination at 832 is NO, at 836, the next statement is used at the current statement, and, processing continues at 808. If the determination at 832 is YES, at 840, the execution environment returns from module execution, and, no further processing occurs.

Figure 9:
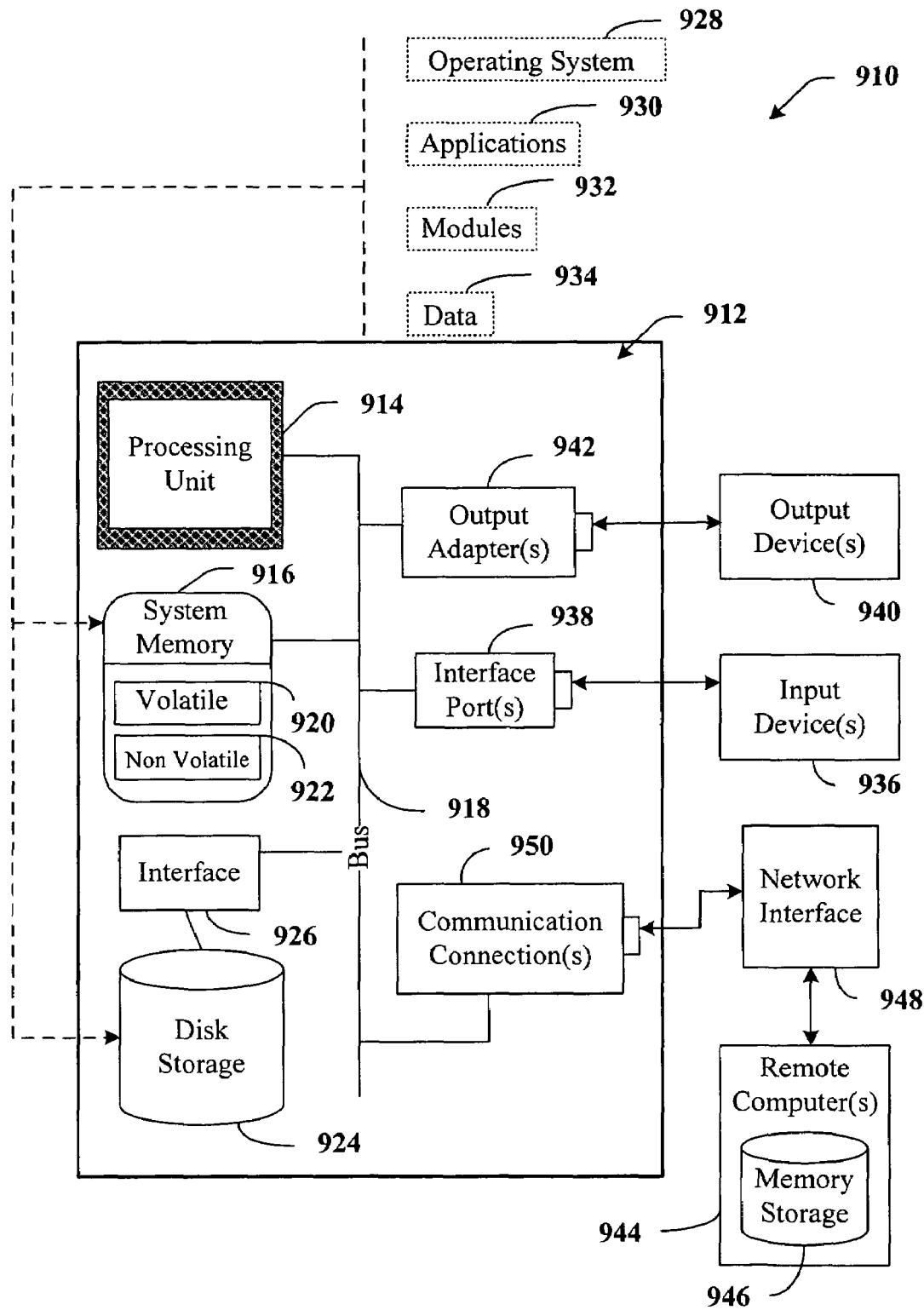
FIG. 9 illustrates an example operating environment in which the invention may function.

In order to provide additional context for various aspects of the subject invention, FIG. 9 and the following discussion are intended to provide a brief, general description of a suitable operating environment 910 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the subject invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
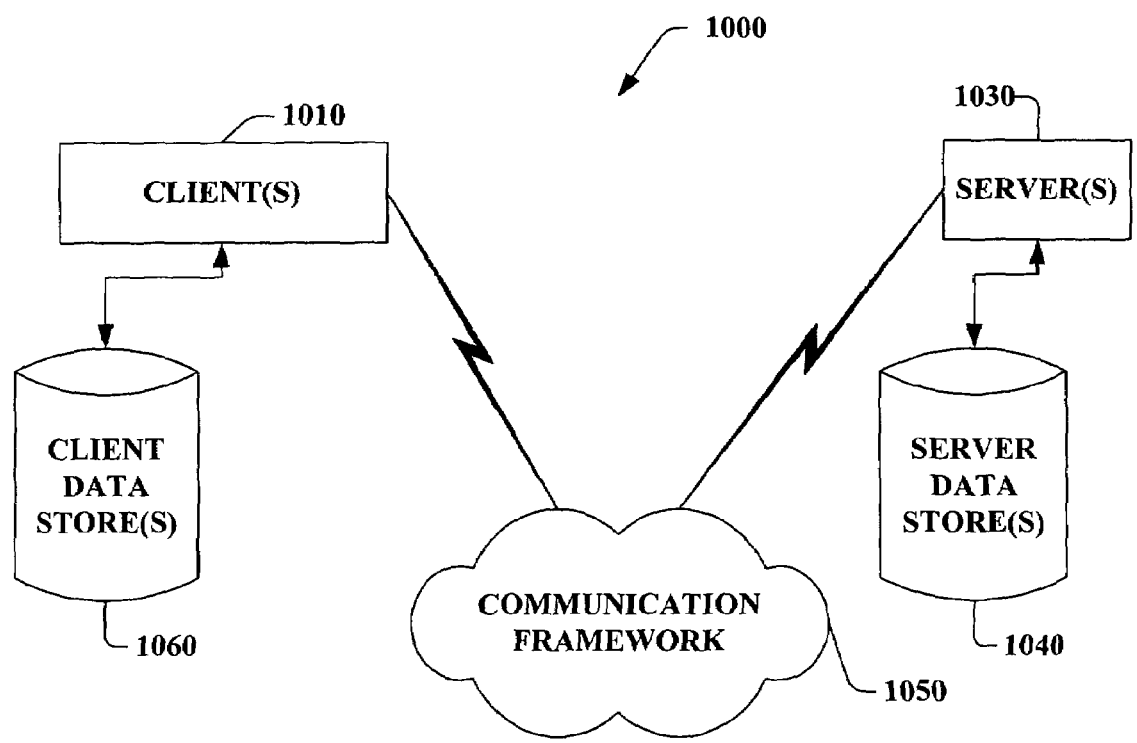
FIG. 10 illustrates an exemplary networking environment that can be employed in connection with the subject invention.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A query plan execution system comprising:
   a memory;
   one or more processors;
   a plan guide metadata store that stores one or more plan guides that are each associated with one or more queries, wherein each plan guide comprises one or more hints that are supplied by a user independently of the creation of and without modifying the associated one or more queries, wherein each plan guide is one of multiple types including object, SQL, and template types; and an execution environment that, upon receiving a query to be executed, accesses the plan guide metadata store to determine whether the query is associated with one or more of the plan guides, and upon locating a matching plan guide, modifies at least one query statement of the query with the one or more hints of the matching plan guide such that the one or more hints are used to guide an optimization process that generates a query plan for the query wherein: when the query is part of a stored procedure, the matching plan guide is of type object, when the query is part of a batch of query statements, the matching plan guide is of type SQL, and when the matching plan guide is of type template, the matching plan guide directs the execution environment to force parameterization of the query.

2. The system of claim 1, further comprising a plan guide modification system through which the user provided input to selectively drop, enable and/or disable one or more plan guides.

3. The system of claim 1, wherein the query is part of an entity comprising one of a batch of query statements, a module, or a stored procedure, and wherein the execution environment parameterizes a statement of the entity using forced parameterization.

4. The system of claim 1, wherein the query is part of an entity comprising one of a batch of query statements, a module, or a stored procedure, and wherein the execution environment parameterizes a statement of the entity using simple parameterization.

5. The system of claim 1, wherein only plan guides scoped to a current database are available to the execution environment.

6. The system of claim 1, wherein modifying at least one query statement of the query comprises adding or modifying an option clause to the query statement, the option clause including the one or more hints.

7. The system of claim 1, wherein the query is part of a module.

8. A method for providing hints for optimizing a query that is contained within an application such that a user cannot modify the query prior to the application providing the query to an execution environment for execution, the method comprising:

receiving user input that specifies a plan guide that is to be associated with one or more queries, the plan guide comprising one or more hints for use in an optimization process that optimizes an associated query by generating a query plan, the one or more queries being part of an application such that a user cannot modify the one or more queries without modifying the application, wherein the plan guide is one of multiple types including object, SQL, and template types;

receiving a first query from the application;

determining that the first query is associated with the plan guide;

modifying the first query with the one or more hints of the plan guide; and optimizing the first query based in part on the one or more hints, the one or more hints being used to generate a query plan for executing the first query wherein: when the first query is part of a stored procedure, the plan guide is of type object, when the first query is part of a batch of query statements, the plan guide is of type SQL, and when the plan guide is of type template, the plan guide directs the execution environment to force parameterization of the first query.

9. The method of claim 8, wherein the first query is part of an entity comprising one of a batch of query text or a module.

10. The method of claim 8 further comprising at least one of the following:

executing the query plan; and updating a plan cache with the query plan.

11. A computer storage medium having stored thereon computer executable instructions for carrying out the method of claim 8.

12. A computer storage medium comprising instructions that, when executed by a processor, perform a method comprising:

receiving user input that specifies a plan guide that is to be associated with one or more queries, the plan guide comprising one or more hints for use in an optimization process that optimizes an associated query by generating a query plan, the one or more queries being part of an application such that a user cannot modify the one or more queries without modifying the application, wherein the plan guide is one of multiple types including object, SQL, and template types;

storing the specified plan guide in a plan guide metadata store;

receiving a module from the application, the module comprising one or more queries;

for each of the one or more queries in the module, accessing the plan guide metadata store to determine whether a plan guide exists that is associated with the query;

determining that a first query of the module is associated with the plan guide specified by the user input;

modifying the first query by adding the one or more hints in the specified plan guide to the first query; and optimizing the first query using the added one or more hints wherein: when the first query is part of a stored procedure, the plan guide is of type object, when the first query is part of a batch of query statements, the plan guide is of type SQL, and when the plan guide is of type template, the plan guide directs the execution environment to force parameterization of the first query.

* * * * *